United States Patent
Mori

(10) Patent No.: US 7,888,830 B2
(45) Date of Patent: Feb. 15, 2011

(54) DYNAMO APPARATUS FOR BOAT

(75) Inventor: Hisanori Mori, Amagasaki (JP)

(73) Assignee: Yanmar Co., Ltd., Osaka-Shi, Osaka (JP)

( * ) Notice: Subject to any disclaimer, the term of this patent is extended or adjusted under 35 U.S.C. 154(b) by 325 days.

(21) Appl. No.: 11/913,745

(22) PCT Filed: Apr. 25, 2006

(86) PCT No.: PCT/JP2006/308654
§ 371 (c)(1),
(2), (4) Date: Feb. 8, 2008

(87) PCT Pub. No.: WO2006/120894
PCT Pub. Date: Nov. 16, 2006

(65) Prior Publication Data
US 2009/0085358 A1 Apr. 2, 2009

(30) Foreign Application Priority Data
May 6, 2005 (JP) .............................. 2005-135295

(51) Int. Cl.
*H02K 9/00* (2006.01)
(52) U.S. Cl. ...................... 310/60 R; 310/58
(58) Field of Classification Search .............. 310/60 R, 310/58, 59, 62, 63; 290/1 B
See application file for complete search history.

(56) References Cited
U.S. PATENT DOCUMENTS
5,704,338 A   1/1998   Andersson et al.

(Continued)

FOREIGN PATENT DOCUMENTS
EP   1 426 288   6/2004

(Continued)

OTHER PUBLICATIONS
International Search Report for International Application No. PCT/JP2006/308654, Japanese Patent Office, mailed Apr. 11, 2006, 3 pgs.

(Continued)

*Primary Examiner*—Dang D Le
(74) *Attorney, Agent, or Firm*—Sterne, Kessler, Goldstein & Fox, P.L.L.C.

(57) ABSTRACT

A casing (31) is provided around a power transmission shaft (3*a*) interposed between a crankshaft (2*a*) of an engine (2) and a power transmission device (3). A dynamo apparatus (10) and a cooling fan (23) cooling the dynamo apparatus are constructed in the casing (31) around the power transmission shaft (3*a*) and are driven by the power transmission shaft (3*a*). The casing (31) is cylindrical and comprises a connection surface at a side of the engine (2), a connection surface at a side of the power transmission device (3) and an outer peripheral surface between the connection surfaces. Intake holes (3*d*) are formed in the connection surface (3*e*) of the casing (31) at the side of the power transmission device and the intake hole is formed at an inner peripheral side of a blade of the fan, and are arranged on a circle centering on the axial direction of the connection surface (3*e*) at an inner peripheral side of blades (23*a*) of the fan (23). An exhaust hole (21*b*) is formed in a portion (21*a*) of the casing (31) at the side of the engine.

9 Claims, 5 Drawing Sheets

U.S. PATENT DOCUMENTS

| | | | | |
|---|---|---|---|---|
| 5,796,195 | A * | 8/1998 | Miyakawa | 310/68 B |
| 5,936,320 | A | 8/1999 | Takeda et al. | |
| 6,011,339 | A * | 1/2000 | Kawakami | 310/208 |
| 6,617,718 | B2 * | 9/2003 | Oohashi et al. | 310/62 |

FOREIGN PATENT DOCUMENTS

| | | |
|---|---|---|
| JP | 58-150373 | 10/1983 |
| JP | 1-180175 | 12/1989 |
| JP | 7-184351 | 7/1995 |
| JP | 2003-81185 | 3/2003 |
| JP | 2003-81189 | 3/2003 |
| JP | 2003-81190 | 3/2003 |
| WO | WO 96/09679 | 3/1996 |
| WO | WO 2005/032935 A1 | 4/2005 |

OTHER PUBLICATIONS

Patent Abstracts of Japan, abstract of Publication No. JP 2003-081190, Power Generating and Propelling System for Ship, published Mar. 19, 2003, (listed on accompanying PTO/SB/08A as document FP1).

Patent Abstracts of Japan, abstract of Publication No. 07-184351, Dynamo-Electric Machine, published Jul. 21, 1995, (listed on accompanying PTO/SB/08A as document FP7).

Patent Abstracts of Japan, abstract of Publication No. 2003-081189, Power Generating and Propelling System for Ship, published Mar. 19, 2003, (listed on accompanying PTO/SB/08A as document FP2).

Patent Abstracts of Japan, abstract of Publication No. 2003-081185, Power Generating and Propelling System for Ship, published Mar. 19, 2003, (listed on accompanying PTO/SB/08A as document FP3).

Supplementary European Search Report for EP Appl. No. 06732314, dated Apr. 16, 2010, 2 pgs.

* cited by examiner

DYNAMO APPARATUS FOR BOAT

BACKGROUND OF THE INVENTION

1. Technical Field

The present invention relates to a dynamo apparatus for a boat, wherein the boat has a sail engine and a dynamo apparatus supplying electric power to the inboard.

2. Background Art

A propelling device of a boat comprises an engine and a power transmission device. Driving force of the engine is reduced in speed by the power transmission device and then drives a screw connected to the power transmission device. A dynamo apparatus is disposed between the engine and the power transmission device. The engine output drives the dynamo apparatus while driving the screw, and the output electric power of the dynamo apparatus is supplied to the inboard. Such an art is disclosed by the Patent Literature 1 or 2.

With regard to construction of the above-mentioned conventional dynamo apparatus, it is cooled by making cooling water pass inside the dynamo apparatus. It is thus necessary to provide a pump taking cooling water in and a cooling water circuit. Accordingly, the whole construction including the dynamo apparatus is complicated, the part number is increased and the cost is increased compared to the present invention.

With regard to construction the cooling air passes inside the dynamo apparatus. It is thus necessary only to provide a cooling fan and to form air holes in a casing of the dynamo apparatus. Accordingly, the construction is simpler than that of the construction using cooling water. For example, the Patent Literature 3 discloses the construction that the cooling fan is provided in the casing of the dynamo apparatus and the air holes are formed in the outer peripheral surface of the casing. The Patent Literature 4 discloses the construction that the air holes are formed in the outer peripheral surface of the casing constructed cylindrically and the cooling fan is provided inside the casing though the construction is not exclusively for a boat.

Patent Literature 1: the Japanese Patent Laid Open Gazette 2003-81189

Patent Literature 2: the Japanese Patent Laid Open Gazette 2003-81190

Patent Literature 3: the International Publication No. 05/32935

Patent Literature 4: the Japanese Patent Laid Open Gazette Hei. 7-184351

BRIEF SUMMARY OF THE INVENTION

Problems to Be Solved by the Invention

With regard to the construction of the air holes disclosed in the Patent Literature 3 or 4, the air holes are formed in the outer peripheral surface of the casing formed cylindrically around a horizontal power transmission shaft between the engine and the power transmission device. Depending on the rotation direction, the hole formed at one of the left and right sides serves as an air induction hole, and the hole formed at the other side serves as an air discharge hole. Namely, an air pass in the casing passes along the rotation direction when viewed along the axis of the power transmission shaft. For spreading cooling air to the whole inside of the casing in the longitudinal direction, it is necessary to form the air holes long along the longitudinal direction (the axial direction of the power transmission shaft). Accordingly, the intensity of the casing must be considered, whereby the cost of the casing may be increased based on the processing and materials. In addition, the Patent Literature 3 also discloses the construction that the cooling fan sends air along the longitudinal direction (the axial direction of the power transmission shaft). However, with regard to this construction, the air holes are also formed on the outer peripheral surface of the cylindrical casing. Accordingly, the structure of the air pass from one of the air holes to the other air hole is complicated, whereby the merit of reduction of cost by simplifying the processing is reduced. Then, with regard to the conventional air cooling structure for the dynamo apparatus, the airing efficiency is low so as to reduce the cooling efficiency.

Means for Solving the Problems

The above-mentioned problems are solved by the following means.

According to claim 1, with regard to a dynamo apparatus for a boat, a casing is provided around a power transmission route from a crankshaft of an engine to a power transmission device, the dynamo apparatus and a cooling fan cooling the dynamo apparatus are constructed in the casing around a power transmission shaft and are driven by the power transmission shaft, the casing is cylindrical and comprises a connection surface at a side of the engine, a connection surface at a side of the power transmission device and an outer peripheral surface between the connection surfaces, at least one intake hole is formed in the connection surface of the casing at the side of the power transmission device at an inner peripheral side of the fan when viewed along the power transmission shaft and at a position evading the power transmission device connected to the connection surface so as to exhaust air from the fan, and an exhaust hole is formed in a portion of the casing at the side of the engine so as to exhaust air from the fan.

According to claim 2, the exhaust hole is formed at an outer peripheral side of the blade when viewed along the power transmission shaft.

According to claim 3, the exhaust hole is formed at an end of the outer peripheral surface of the casing at a side of the engine.

According to claim 4, a plurality of the intake holes are formed on the connection surface at the side of the power transmission device along a circle centering on the power transmission shaft.

According to claim 5, the dynamo apparatus is housed in the casing, a wire of the dynamo apparatus is taken out from a hole formed in the casing, and a wire connection member such as a terminal block or a connector is provided outside the casing.

EFFECT OF THE INVENTION

The present invention constructed as above brings the following effects.

According to claim 1, cooling air flows in the casing by the drive of the fan from the intake hole at the side of the power transmission device to the exhaust hole at the side of the engine, whereby the dynamo apparatus constructed around the power transmission shaft is cooled efficiently by simple and cheap airing structure.

According to claim 2, in addition to the above-mentioned airing structure along the power transmission shaft, cooling air taken in through the intake hole at an inner peripheral side of a blade of the fan is spread to the exhaust hole at the outer peripheral side thereof, whereby the cooling air is easy to be spread to the whole dynamo apparatus so as to cool the dynamo apparatus more efficiently.

According to claim 3, the exhaust hole provided at the side of the engine is not formed in not the connection surface at the side of the engine covered by the engine or a flywheel housing but on the outer peripheral surface so as to secure enough opening area of the exhaust hole, whereby cooling air is discharged from the side of the engine efficiently.

According to claim 4, by increasing the number of the intake holes, cooling efficiency is improved further. By arranging the intake holes on the circle centering on the power transmission shaft, intake effect of each intake hole is equal and each intake hole is constructed compactly.

According to claim 5, the dynamo apparatus is constructed compactly. An electric leak can be provided easily. The terminal block or the connector is arranged at the position higher than the draft. The wiring can be maintained easily.

DETAILED DESCRIPTION OF THE INVENTION

Figure 1:
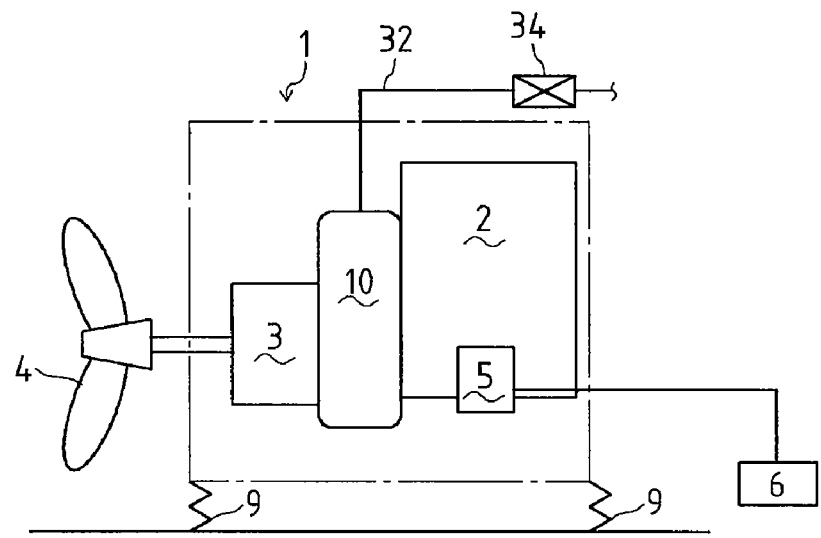
FIG. 1 is a drawing of the entire construction of a propelling device for a boat.

Next, explanation will be given on the mode for carrying out the present invention. A propelling device 1 for a boat shown in FIG. 1 comprises an engine 2 and a power transmission device 3, and a screw 4 is connected to the power transmission device 3. Driving force of the engine 2 is transmitted to the screw 4 through the power transmission device 3 while decelerated, whereby the screw 4 is driven rotatively.

An alternator 5 is provided to the engine 2 and driven by the engine 2. Electric power generated by the alternator 5 is stored in a battery 6.

Furthermore, with regard to the propelling device 1, a dynamo apparatus 10 which is a dynamo or an apparatus having dynamo characteristics is interposed between the engine 2 and the power transmission device 3. The dynamo apparatus 10 is driven by the engine 2, and electric power generated by the dynamo apparatus 10 is supplied to the inboard.

Figure 2:
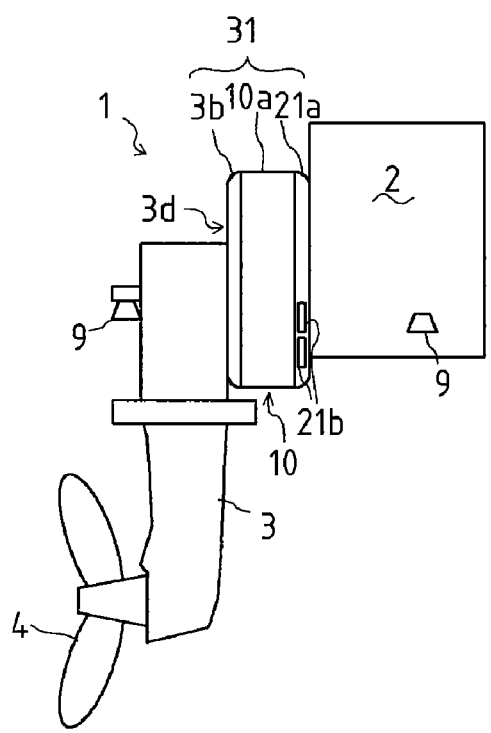
FIG. 2 is a side view of a sail drive type propelling device for a boat.
Figure 3:
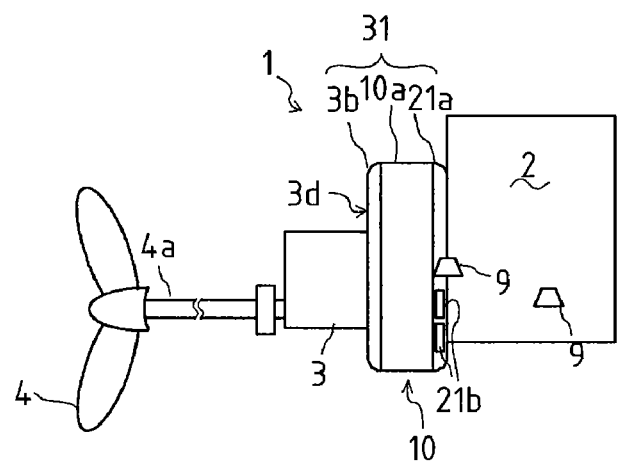
FIG. 3 is a side view of a marine gear type propelling device for a boat.

In addition, the propelling device 1 may be constructed as a sail drive type that the power transmission device 3 is widely extended below the engine 2 and the screw 4 is attached directly to the power transmission device 3 as shown in FIG. 2, or may be constructed as marine gear type that a screw shaft 4a of the screw 4 is attached to the rear end of the power transmission device 3 as shown in FIG. 3.

The propelling device 1 comprising the engine 2, the dynamo apparatus 10 and the power transmission device 3 integrally as mentioned above is supported by a plurality of vibration-proof members 9 such as vibration-proof rubber members and is placed in the body of the boat.

In comparison with the case that an engine driving the dynamo apparatus 10 is provided separately or the case that a dynamo driven by the engine 2 through a pulley or a belt is provided separately to the end of the engine 2, since the dynamo apparatus 10 is interposed between the engine 2 and the power transmission device 3 and is driven by the engine 2, generates larger electric power than the alternator 5 so as to supply enough electric power to the inboard while the propelling device 1 is constructed compactly so as to save space. Since the propelling device 1 is constructed compactly, the propelling device 1 is placed in the boat body easily.

Figure 4:
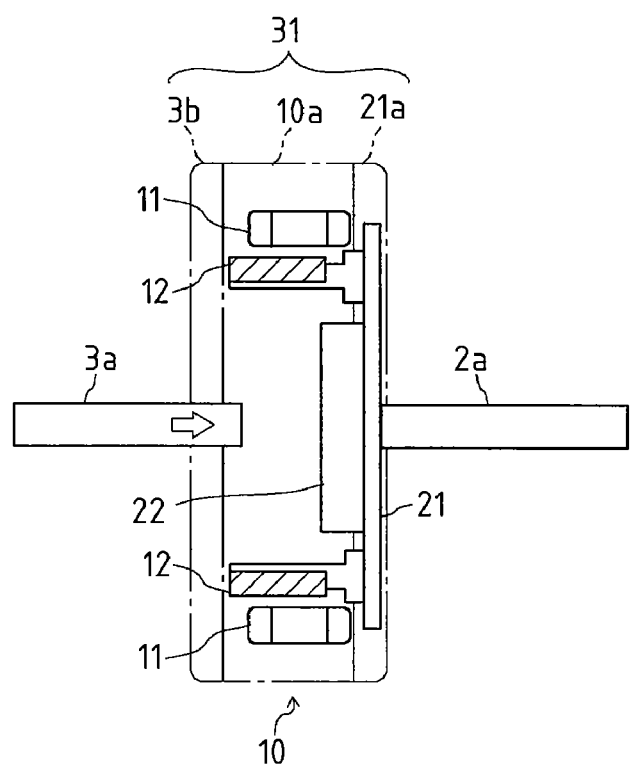
FIG. 4 is a sectional side view of the inside structure of a dynamo apparatus of the propelling device for a boat.

Next, explanation will be given of the construction of the dynamo apparatus 10. As shown in FIG. 4, a flywheel 21 is attached to one end of the engine 2, and is driven rotatively by a crankshaft 2a of the engine 2. The flywheel 21 is covered by a flywheel housing (hereinafter, referred to as "FW housing") 21a.

A dynamo apparatus center casing 10a is connected integrally to the FW housing 21a, and the construction members of the dynamo apparatus 10 are housed in the dynamo apparatus center casing 10a. Concretely, a stator coil 11 is attached to the inner peripheral surface of the dynamo apparatus center casing 10a, and a magnet rotor 12 is arranged at the inner side (the side of the center) of the stator coil 11. The magnet rotor 12 is attached to the flywheel 21 and is rotatable integrally with the flywheel 21.

Figure 5:
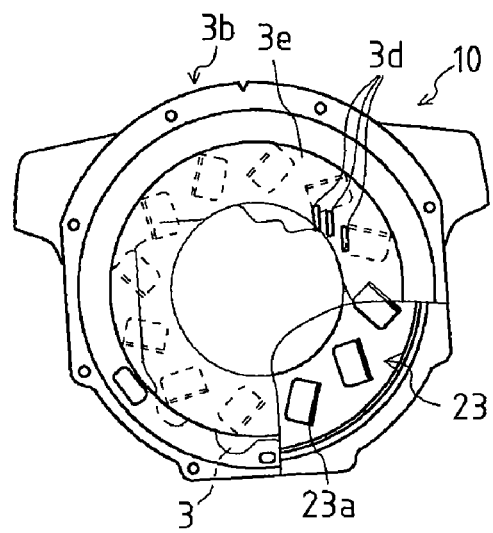
FIG. 5 is a front view of the dynamo apparatus.
Figure 6:
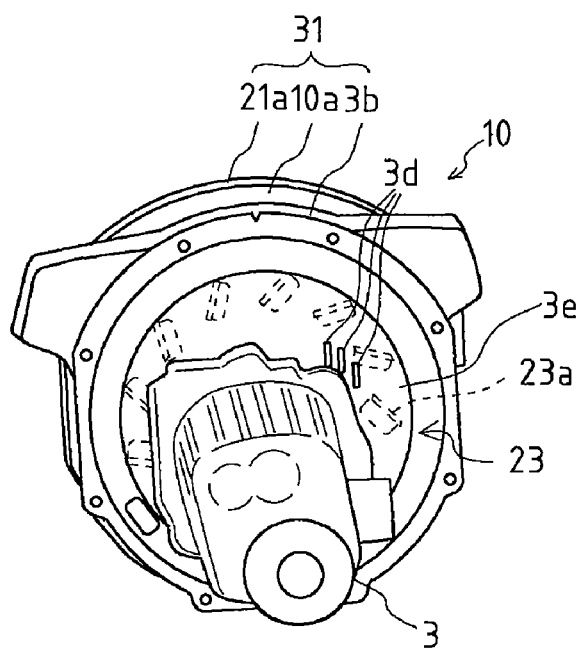
FIG. 6 is a perspective view of the dynamo apparatus.

A mounting flange 3b of the power transmission device 3 can be attached to the dynamo apparatus center casing 10a at the side opposite to the FW housing 21a. By attaching the mounting flange 3b to the dynamo apparatus center casing 10a, the power transmission device 3 is attached and fixed to the engine 2. Accordingly, the dynamo apparatus center casing 10a, the FW housing 21a and the mounting flange 3b constitute integrally a casing 31 covering around the dynamo apparatus. As shown in FIGS. 5 and 6, the power transmission device 3 is attached to the casing 31 through a lid 3e attached to the mounting flange 3b.

The rotary shaft of the dynamo apparatus 10 is the crankshaft 2a of the engine 2, and the axial center of the crankshaft 2a is in agreement with that of an input shaft 3a of the power transmission device 3. Namely, the rotary shaft of the dynamo apparatus 10 is concentric with the crankshaft 2a and the input shaft 3a. By attaching the mounting flange 3b to the dynamo apparatus center casing 10a, the input shaft 3a is connected through a damper 22 to the flywheel 21, whereby the input shaft 3a is driven rotatively by the crankshaft 2a. Accordingly, the input shaft 3a of the power transmission device 3 is extended toward the engine and is connected to the flywheel 21, whereby the input shaft 3a serves as a power transmission shaft interposed between the crankshaft 2a of the engine 2 and the power transmission device 3 in the casing 31 and also serves as a rotary shaft of the dynamo apparatus 10 and a later-discussed cooling fan 23 constructed therearound.

As mentioned above, the casing 31 provided around the input shaft 3a interposed between the crankshaft 2a of the engine 2 and the power transmission device 3 is substantially cylindrical and comprises a connection surface (front end surface) constructed by the FW housing 21a at the side of the engine 2a, a connection surface (rear end surface) constructed by the lid 3e of the mounting flange 3b at the side of the power transmission device 3 and an outer peripheral surface between the connection surfaces.

Figure 7:
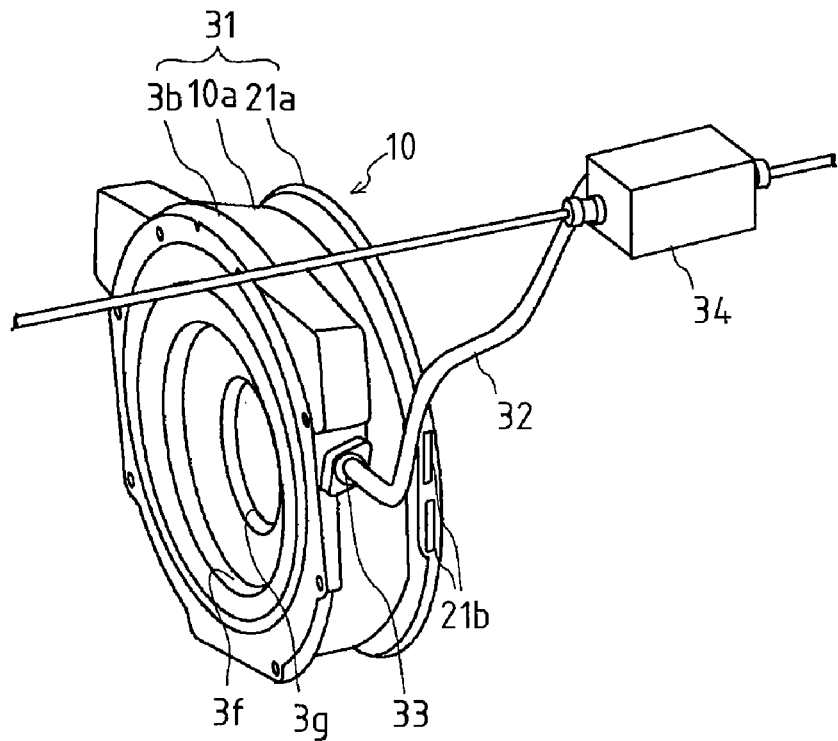
FIG. 7 is a perspective view of the dynamo apparatus from which a cover is removed.
Figure 8:
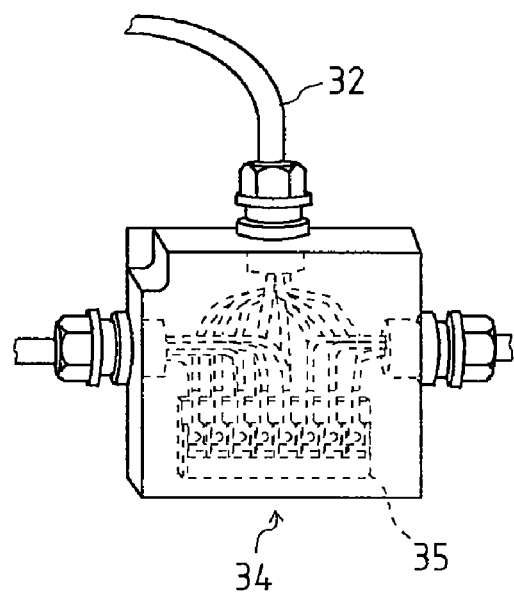
FIG. 8 is a drawing of a piping connection member.

As shown in FIG. 7, a wire 32 is taken out through a hole 33 formed in the casing 31, and a wire connection member 34 which is a terminal block, a connector or the like is arranged outside the casing 31. Namely, the wire connection member 34 is separated from the dynamo apparatus. A terminal block 35 is provided in the wire connection member 34 shown in FIG. 8, and the wire 32 taken out from the stator coil 11 is connected to the terminal block 35 so as to be divided into two directions, and then extended to the outside of the wire connection member 34.

As mentioned above, the wire connection member 34 is provided outside the casing 31 so that the dynamo apparatus 10 is constructed compactly. Since the wire connection member 34 is arranged at the position higher than the draft, the safety is improved. The maintenance work of wiring becomes easy. The wiring is connected at the place at which engine vibration is low so as to prevent the wiring connection part from loosening.

Explanation will be given on the cooling construction of the dynamo apparatus 10. As shown in FIGS. 5 to 7, with regard to the casing 31 covering around the dynamo apparatus, the cooling fan is provided in the mounting flange 3b. Three air holes 3d as intake holes are formed in the lid 3e closing the mounting flange 3b. Two air holes 21b as exhaust holes are formed in the FW housing 21a.

Accordingly, the cooling fan 23 rotated following the drive of the engine 2 takes cooling air into the dynamo apparatus 10 through the air holes 3d, and the cooling air after cooling the magnet rotor 12, the stator coil 11 and the like is discharged outside through the air holes 21b, whereby the dynamo apparatus 10 is cooled efficiently by the drive of the engine 2. Cooling air is taken in from the side opposite to the engine so that the cooling air is hardly influenced of the heat of the engine, thereby improving cooling efficiency.

The cooling fan 23 is a centrifugal fan and is constructed by standingly providing blades 23a on a surface of a disk at the side of the power transmission device 3. Each of the blades 23a of the cooling fan 23 is substantially L-like shaped when viewed in side, and the blades 23a are disposed along the circle centering on the input shaft 3a at regular intervals.

The mounting flange 3b is closed by the lid 3e at the side of the power transmission device 3, and the air holes (intake holes) 3d are formed in the lid 3e. As shown in FIG. 7, at the side of the power transmission device 3, a dent 3f is formed in the mounting flange 3b at the inner peripheral side, and a through-hole 3g is formed at the center of the dent 3f The air holes 3d are arranged concentrically at regular intervals on an inner circle relative to the cooling fan 23—and are formed at the upper right portion of the lid 3e so as to keep away from the position at which the power transmission device 3 is arranged.

The air holes (exhaust holes) 21b are formed in the lower portion of the outer perimeter of the FW housing 21a.

Figure 9:
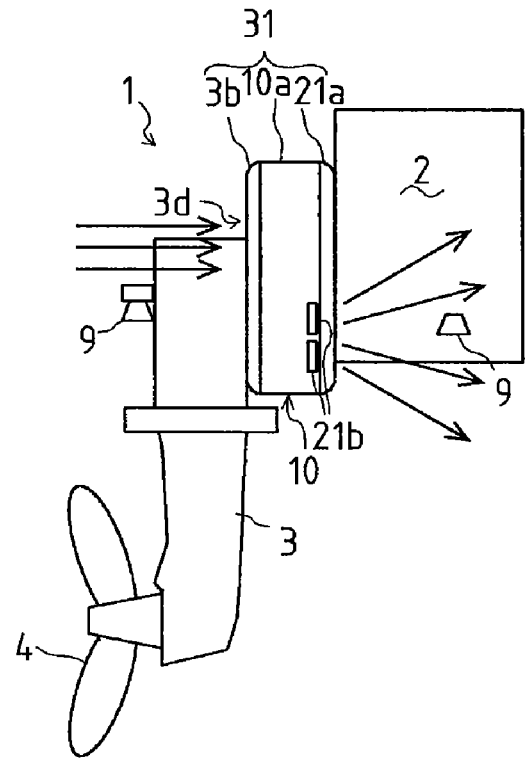
FIG. 9 is a drawing of supply and exhaust of cooling air for the dynamo apparatus of the sail drive type boat.
Figure 10:
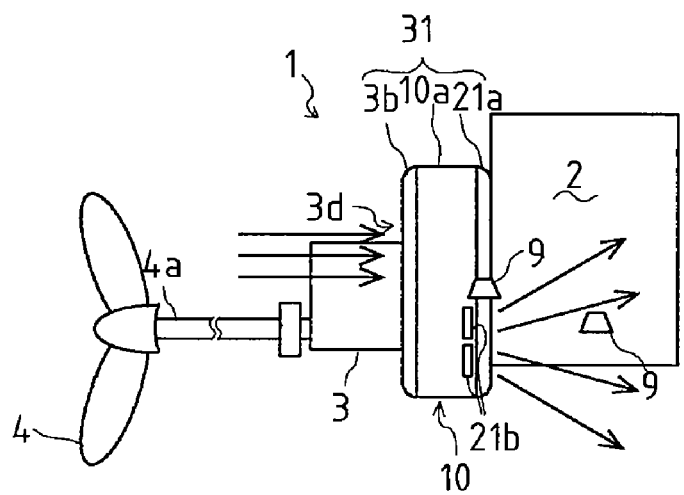
FIG. 10 is a drawing of supply and exhaust of cooling air for the dynamo apparatus of the marine gear type boat.

As shown in FIGS. 9 and 10, cooling air taken in through the air holes 3d arranged on an inner circle relative to than the fan passes through the through-hole 3g at the center of the mounting flange 3b and spreads toward the outer perimeter, and then is discharged downward through the air holes 21b. In addition, the air holes 21b are formed in the lower portion of the outer perimeter of the FW housing 21a so that no obstacle exists at the space below the engine 2, whereby the air is discharged smoothly.

As mentioned above, a plurality of the air holes 3d are formed in the vicinity of the cooling fan 23 along the rotation of the cooling fan 23 so that cooling air is taken into the dynamo apparatus 10 efficiently. Cooling air taken in from the inner peripheral side of the blades 23a of the cooling fan is spread to the outer peripheral side by the rotation of the blades 23a so that the cooling air is extended easily to the whole dynamo apparatus 10, whereby the dynamo apparatus 10 is cooled efficiently. The cooling air taken in from the side of the power transmission device 3 and spread to the outer peripheral side by the rotation of the blades 23a is discharged efficiently to the side of the engine through the air holes 21b provided in the outer peripheral surface of the casing 31. In addition, though the three intake air holes 3d and two exhaust air holes 21b are provided in this embodiment, the number of the air holes are not limited thereto.

INDUSTRIAL APPLICABILITY

The present invention is adoptable as an easy and cheap cooling device for a dynamo apparatus of a boat propelling device that the dynamo apparatus is provided on a power transmission route between an engine and a power transmission device.

The invention claimed is:

1. A dynamo apparatus for a boat interposed between an engine and a power transmission, the dynamo apparatus comprising:
a casing connected integrally with the engine and the power transmission, wherein:
the casing is provided around a power transmission route from a crankshaft of the engine to the power transmission device;
the dynamo apparatus and a cooling fan cooling the dynamo apparatus are constructed in the casing around a power transmission shaft and are driven by the power transmission shaft;
the casing is cylindrical and comprises a connection surface at a side of the engine, a lateral surface having a connection surface at a side of the power transmission device and an outer peripheral surface between the connection surfaces;
an intake hole is formed in the lateral surface of the casing at the side of the power transmission device at an inner peripheral side of the fan when viewed along the power transmission shaft and at a position evading the power transmission device connected to the lateral surface so as to induce air to the fan; and
an exhaust hole is formed in a portion of the casing at the side of the engine so as to exhaust air from the fan.

2. The dynamo apparatus for a boat as set forth in claim 1, wherein the exhaust hole is formed at an outer peripheral side of the blade when viewed along the power transmission shaft.

3. The dynamo apparatus for a boat as set forth in claim 2, wherein the exhaust hole is formed at an end of the outer peripheral surface of the casing at a side of the engine.

4. The dynamo apparatus for a boat as set forth in claim 3, wherein a plurality of the intake holes are formed on the lateral surface at the side of the power transmission device along a circle centering on the power transmission shaft.

5. The dynamo apparatus for a boat as set forth in claim 3, wherein:
the dynamo apparatus is housed in the casing;
a wire of the dynamo apparatus is taken out from a hole formed in the casing; and
a wire connection member is provided outside the casing.

6. The dynamo apparatus for a boat as set forth in claim 2, wherein a plurality of the intake holes are formed on the lateral surface at the side of the power transmission device along a circle centering on the power transmission shaft.

7. The dynamo apparatus for a boat as set forth in claim 2, wherein:
the dynamo apparatus is housed in the casing;

a wire of the dynamo apparatus is taken out from a hole formed in the casing; and a wire connection member is provided outside the casing.

8. The dynamo apparatus for a boat as set forth in claim 1, wherein a plurality of the intake holes are formed on the lateral surface at the side of the power transmission device along a circle centering on the power transmission shaft.

9. The dynamo apparatus for a boat as set forth in claim 1, wherein:

the dynamo apparatus is housed in the casing;

a wire of the dynamo apparatus is taken out from a hole formed in the casing; and a wire connection member is provided outside the casing.

\* \* \* \* \*